(12) United States Patent
Pospeshil (10) Patent No.: US 6,554,362 B1
(45) Date of Patent: Apr. 29, 2003

(54) MANUAL FOLD-FLAT SEAT HINGE ASSEMBLY

(75) Inventor: James V. Pospeshil, St. Clair Shores, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/825,411

(22) Filed: Apr. 3, 2001

(51) Int. Cl.[7] .................................................. B60N 2/20
(52) U.S. Cl. .............................. 297/378.14; 297/378.12
(58) Field of Search .................. 297/367, 378.12, 297/378.14

(56) References Cited

U.S. PATENT DOCUMENTS

| | | | | |
|---|---|---|---|---|
| 3,736,026 A | * | 5/1973 | Ziegler et al. | 297/378.12 |
| 4,243,264 A | | 1/1981 | Bell | |
| 4,279,442 A | | 7/1981 | Bell | |
| 4,733,912 A | | 3/1988 | Secord | |
| 4,919,482 A | * | 4/1990 | Landis et al. | 297/378.14 |
| 5,489,141 A | | 2/1996 | Strausbaugh et al. | |
| 5,590,932 A | | 1/1997 | Olivieri | |
| 5,622,410 A | | 4/1997 | Robinson | |
| 5,628,215 A | * | 5/1997 | Brown | 297/378.14 |
| 5,718,481 A | | 2/1998 | Robinson | |
| 6,047,444 A | | 4/2000 | Braun | |
| 6,074,009 A | * | 6/2000 | Farino | 297/378.14 |
| 6,161,899 A | | 12/2000 | Yu | |

FOREIGN PATENT DOCUMENTS

| | | |
|---|---|---|
| DE | 43 24 734 A1 | 1/1995 |
| GB | 1 546 104 | 5/1979 |
| WO | WO 96/20848 | 7/1996 |

* cited by examiner

Primary Examiner—Peter R. Brown
(74) Attorney, Agent, or Firm—Harness, Dickey & Pierce, P.L.C.

(57) ABSTRACT

A seat back adjustment mechanism for a seat assembly enabling a seat back to be selectively positioned in various fold-forward positions relative to a seat, and locked into at least one forward position, includes a quadrant supporting a cam plate that interfaces with a locking member to block an arm rotatably supporting the quadrant. The arm preferably includes a series of pawl teeth for selectively engaging the locking member to lock the seat back in a selected fold-forward position. Alternatively, the arm includes a corner portion for locking the seat back in a single fold-forward position.

20 Claims, 7 Drawing Sheets

MANUAL FOLD-FLAT SEAT HINGE ASSEMBLY

BACKGROUND OF THE INVENTION

1. Technical Field

The present invention relates generally to seat back adjustment mechanisms and more particularly to a seat back adjustment mechanism that enables a seat back to be locked in a plurality of forward fold-down positions.

2. Discussion

Vehicle markets such as mini-van and sport utility are extremely competitive and a focus for improvement by automobile manufacturers. Specifically, automobile manufacturers seek to improve the overall utility and comfort of the vehicles in these markets in pursuit of attracting and keeping customers. One important feature is a flexible vehicle interior. Flexibility, in this sense, refers to the interior's ability to provide seating that may be modified to suit a particular customer's needs. For example, a customer might desire the removal of a rear seat to provide increased cargo space, while maintaining a middle seat or seats for additional passengers. Additionally, a passenger might desire the seat back of a front or middle seat to fold down, providing a work space while travelling. As such, a passenger could place a laptop computer on the folded down seat back or use the folded down seat back as a small desk for writing or reading.

While providing flexibility, vehicle seats must also include features for maintaining an occupant's comfort, such as the ability to recline a seat back to any one of a number of desired positions. A variety of seat-back recliner and fold-forward adjustment mechanisms are commonly known in the art. But, traditional fold-forward adjustment mechanisms simply release the seat back such that it may be folded forward to a position generally parallel to the seat. Further, traditional adjustment mechanisms only provide a single fold-forward position for the seat back and are not locked in that position. If such a seat back including conventional recliner or fold-forward adjustment mechanisms was placed in the fold-forward position to be used by a passenger as a work surface while travelling, a problem might arise as the vehicle comes to a stop. A flat folded-forward seat back would allow items on the work surface, e.g., a laptop computer or book, to slide and possibly fall from the seat back during braking and acceleration of the vehicle.

It is therefore desirable in the industry to provide a fold-forward adjustment mechanism for use with a seat back that enables an operator to lock the seat back in a desired forward position. As such, a seat back could be folded forward while providing sufficient angle to prevent an object, such as a laptop computer or book, from sliding forward during braking.

SUMMARY OF THE INVENTION

The present invention provides an adjustment mechanism that enables a seat back to be locked in a plurality of forward fold-down positions relative to a seat. Accordingly, a back surface of a seat back can be positioned parallel to the seat or locked at various acute angles relative to the seat.

The adjustment mechanism, according to the principles of the present invention, includes inner and outer plates rotatably supported by an arm. The arm includes a first portion having a plurality of pawl teeth for selectively engaging a locking member, which is slidably supported between the inner and outer plates for locking the inner and outer plates in a plurality of rotational positions relative to the arm. A cam plate is rotatably supported between the inner and outer plates and is biased by a biasing member toward engaging the locking member. The cam plate can be operated to relieve the locking member, enabling a seat back to be rotated forward relative to the arm. Once rotated to a desired position, the adjustment member of the present invention can lock the seat back in that position.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
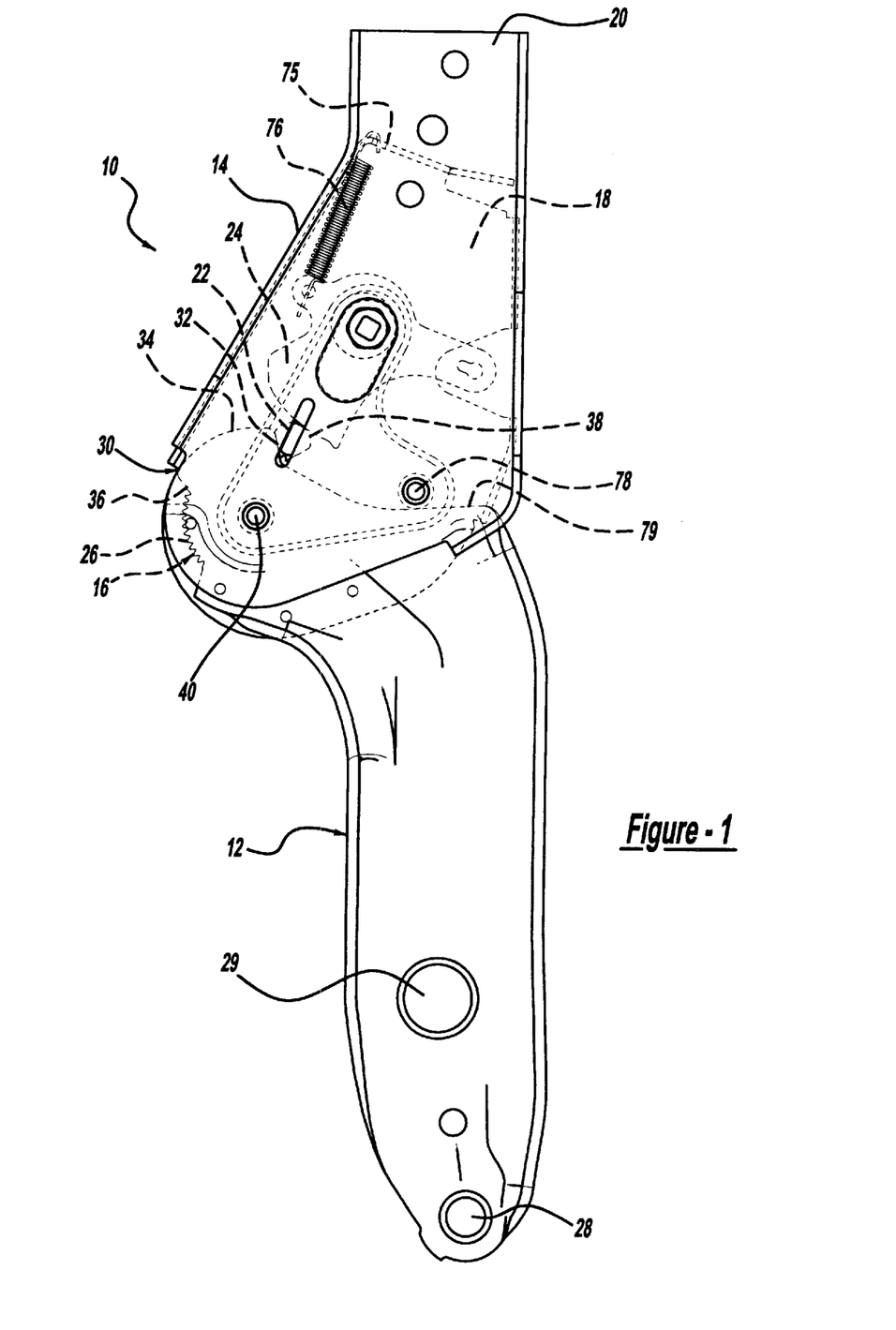
FIG. 1 is a side view of an adjustment mechanism according to the present invention.
Figure 2:
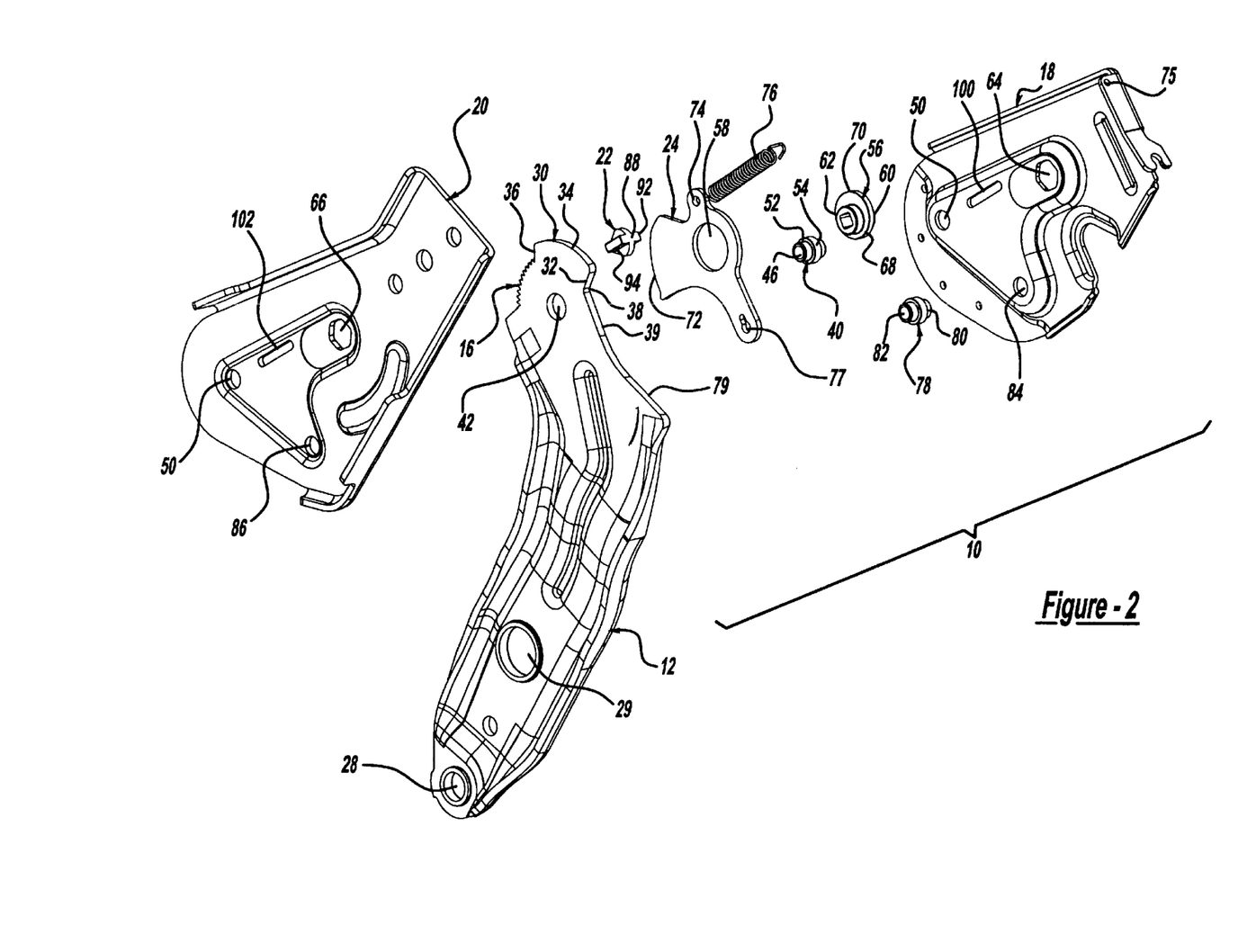
FIG. 2 is an exploded perspective view of the adjustment mechanism.

With particular reference to FIGS. 1 and 2, an adjustment mechanism 10 for use with a seat assembly is shown. The adjustment mechanism 10 generally includes an arm 12 disposed between and pivotally mounted relative to a quadrant 14 including inner and outer plates 18,20 and selectively locked relative to the quadrant 14 by a locking member 22. The locking member 22 is selectively engaged by a cam plate 24.

A first end of the arm 12 includes a portion 16 having a plurality of pawl teeth 26. A second end of arm 12 includes an aperture 28 for connecting to a linear recliner mechanism and an aperture 29 is included for providing a pivot axis for the adjustment mechanism 10 (see FIGS. 6a through 7). The first end of the arm 12 further includes a shoulder 30 having a first side surface 32, a top surface 34, and a second side surface 36. The first side surface 32 forms a corner 38 of the arm 12 at a junction with a top surface 39.

The arm 12 is disposed between and rotatably supports the inner and outer plates 18,20 on a first pivot 40. The first pivot 40 is received through an aperture 42 of the arm 12. The first pivot 40 includes first and second cylindrical extensions 44,46 that are receivable into and supported by first and second apertures 48,50, respectively, of the inner and outer plates 18 and 20. The first pivot 40 further includes a support bearing 52 that extends radially and is disposed between the first and second cylindrical extensions 44,46. The support bearing 52 includes a bearing surface 54 which is received into the aperture 42 for rotatably supporting the quadrant 14 relative to the arm 12.

The cam plate 24 is also disposed between the inner and outer plates 18,20 and is rotatably supported by a second pivot 56 received through a central aperture 58 of the cam plate 24. The second pivot 56 includes first and second cylindrical extensions 60,62 that are receivable into and supported by first and second apertures 64,66, respectively. The second pivot 56 also includes a support bearing 68 that extends radially and is disposed between the first and second cylindrical extensions 60,62. The support bearing 68 includes a bearing surface 70 which is received into the aperture 58 for rotatably supporting the cam plate 24.

Figure 6A:
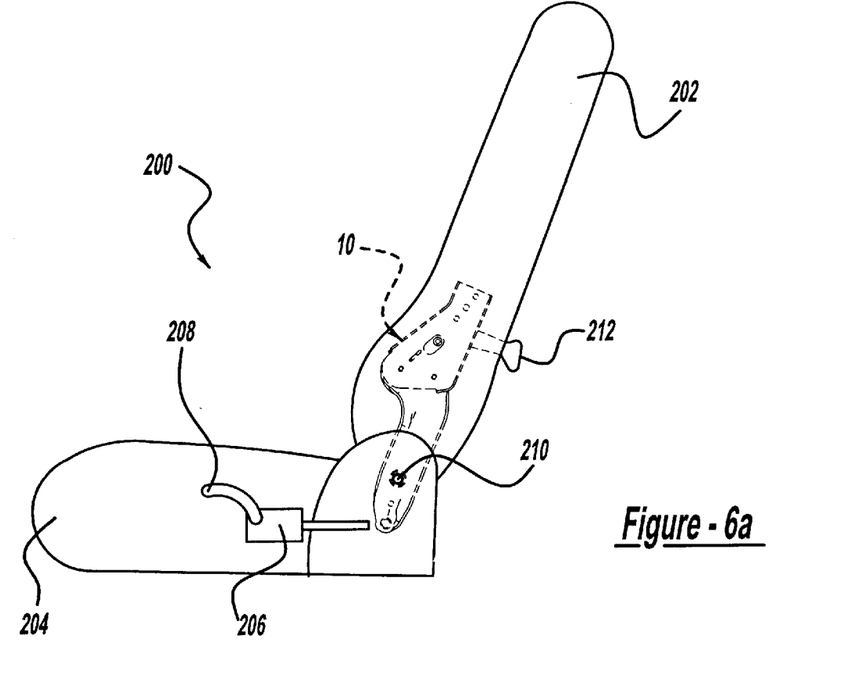
FIGS. 6a, 6b and 6c are side schematic views of a seat assembly including the adjustment mechanism of the present invention illustrating a seat back in various positions relative a seat.
Figure 6B:
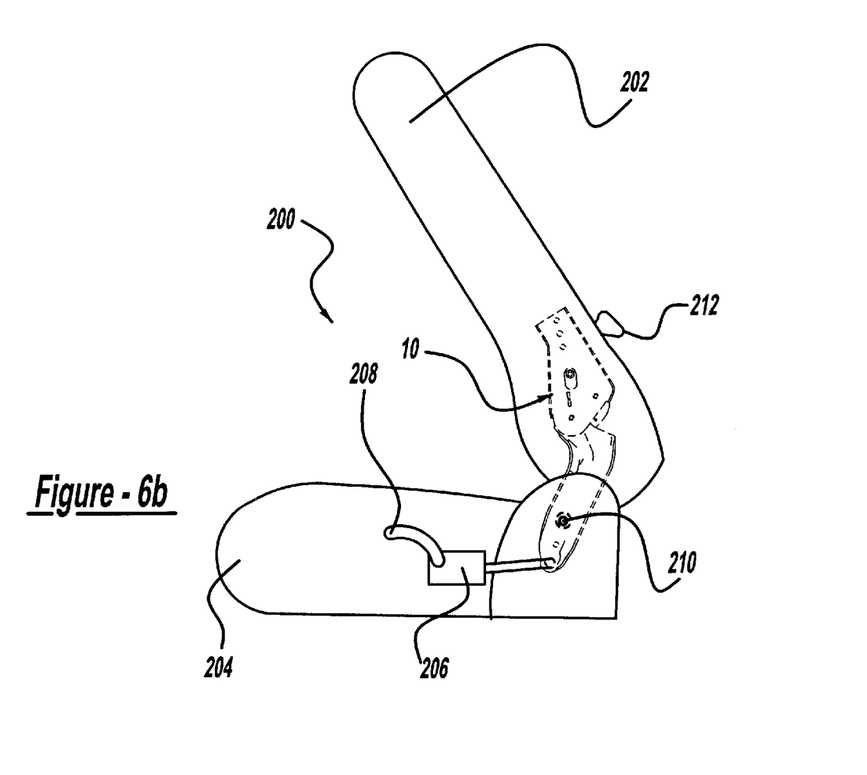
Figure 6C:
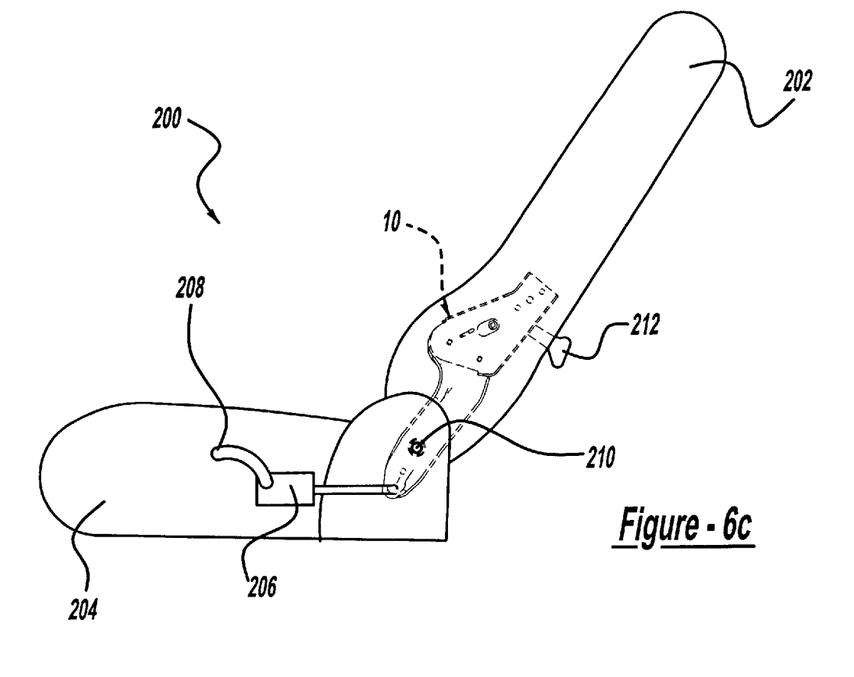

One end of the cam plate 24 includes a cam surface 72. An opposite end of the cam plate 24 includes an aperture 74 for anchoring a first end of a spring 76 and the inner plate 18 includes an aperture 75 for anchoring a second end of the spring 76. An arm of cam plate 24 includes an additional aperture 77 for connection to a release handle 212 (FIG. 6). The spring 76 rotationally biases the cam plate 24 in a first rotational direction, which biases the cam surface 72 toward the locking member 22, which, in turn, is forced toward the corner 38 and against the first side surface 32 of the arm 12. In this position, the quadrant 14 is held in a first upright position relative to the arm 12. A cross member 78 includes cylindrical extensions 80,82 received into apertures 84,86, respectively, of the inner and outer plates 18,20. The cross member 78 contacts a face 79 of the arm 12 for prohibiting reward rotation of the quadrant 14 relative to the arm 12.

The locking member 22 is a wedge-shaped member having a arcuate surface 88 at a wide end for engaging the cam surface 72 of the cam plate 24 and a notch 90 disposed in a narrow end. The notch 90 is adapted to engage the pawl teeth 26 of the arm 12 for locking the quadrant 14 relative the arm 12. Ribs 92,94 extend perpendicularly from the side faces of the locking member 22. The ribs 92,94 are slidably supported within slots 100,102 of the inner and outer plates 18,20, respectively, enabling the locking member 22 to slide therebetween. The locking member 22 slides in the slots 100,102 as it interfaces between the arm 12 and the cam plate 24. The cam plate 24 acts on the arcuate surface 88 to bias the locking member 22 against the arm 12.

Figure 3:
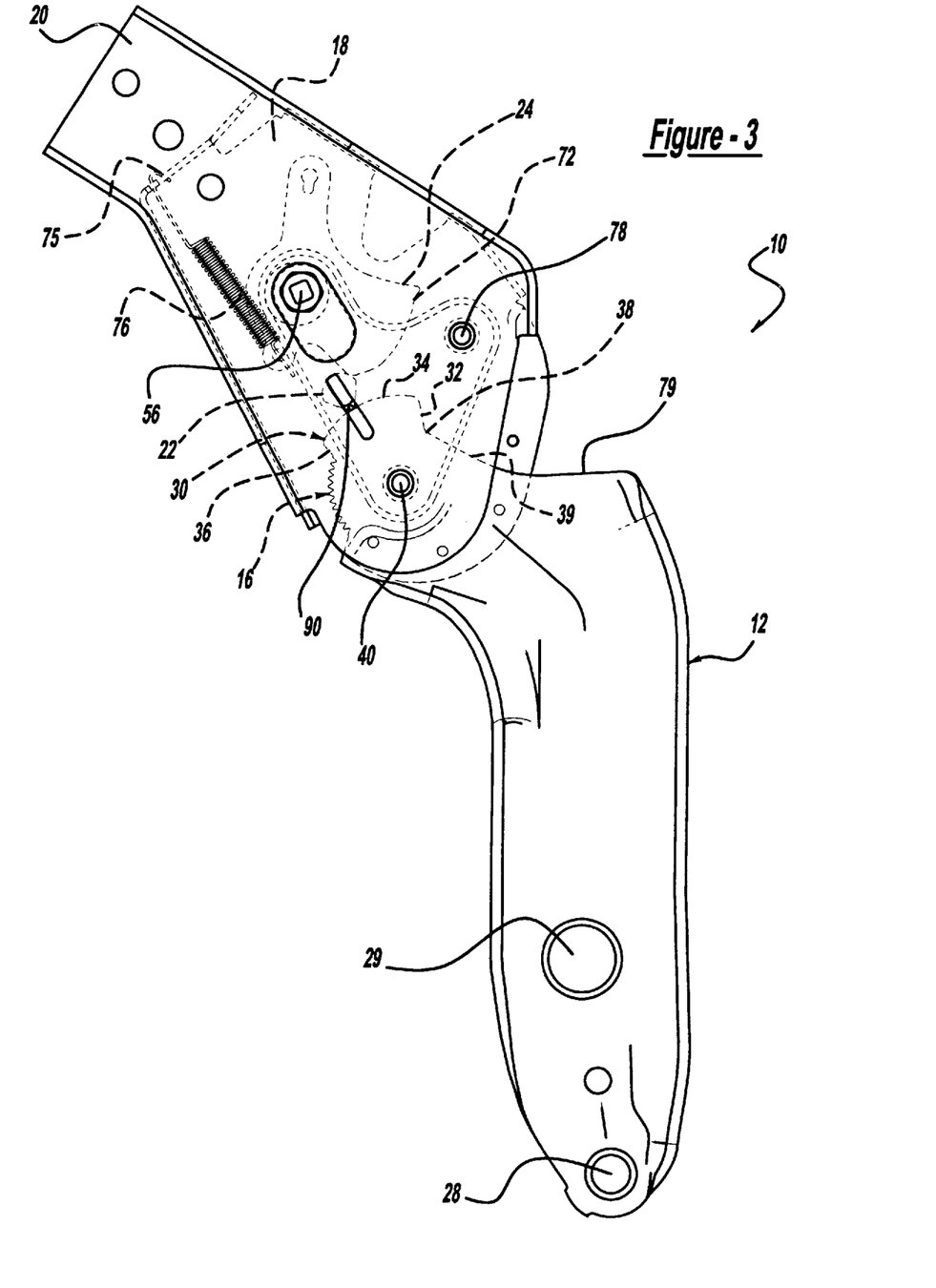
FIG. 3 is a side view illustrating the adjustment mechanism of FIGS. 1 and 2 in a first position.
Figure 4:
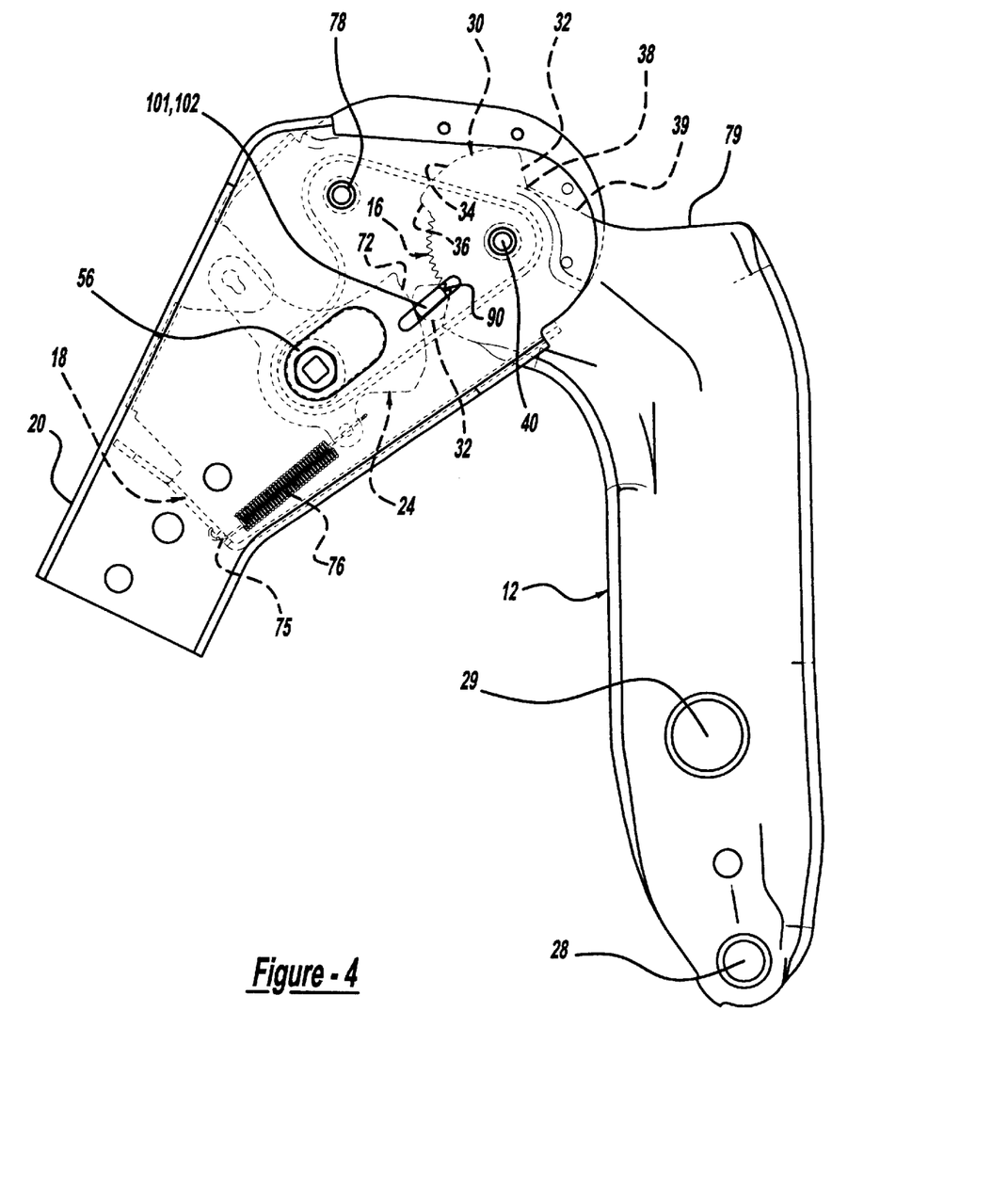
FIG. 4 is a side view illustrating the adjustment mechanism of FIGS. 1 and 2 in a second position.

With particular reference to FIGS. 1, 3 and 4, the operation of the adjustment mechanism 10 will be described in detail. In a first preferred embodiment, the adjustment mechanism 10 enables the quadrant 14 to pivot forward, relative to the arm 12, and lock in a plurality of forwardly inclined positions. To fold the quadrant 14 forward, the cam plate 24 is rotated against the biasing force of the spring 76, forcing the cam surface 72 to slide along and then move away from the arcuate surface 88 of the locking member 22. Thus, the ribs 92,94 of the locking member 22 are free to slide in the slots 100,102 of the inner and outer housing plates 18,20 as the locking member 22 moves from a recessed position adjacent to the first side surface 32 to a raised position on the top surface 34 of the shoulder 30. Specifically, as the cam plate 24 rotates against the bias of the spring 76, the locking member 22 is pinched between the first side surface 32 of arm 12 and the slots 100,102. As the cam surface 72 is moved out of blocking engagement with the locking member 22, upward movement of locking member 22 is unrestricted. As the quadrant 14 is rotated, the walls defining the slots 100,102 of the inner and outer housing plates 18,20 push the locking member 22 upward within slots 100,102 until the locking member 22 slides over onto the top surface 38. Continued forward rotation of the quadrant 14 causes the locking member 22 to slide along the top surface 38, as best seen in FIG. 3. Once the locking member 22 is on the top surface 38, the cam plate 24 may be released wherein the spring 76 again biases the cam plate 24 in the first rotational direction. The cam surface 72 again biases the locking member 22 within the slots 100,102 pushing the locking member 22 against the top surface 38.

Once the quadrant 14 has rotated sufficiently forward, the locking member 22 slides off of the top surface 38 and onto the pawl teeth portion 16. Due to the bias of the cam plate 24, the locking member 22 immediately engages the first pawl tooth 26, wherein the quadrant 14 is held in a first forward inclined position relative to the arm 12.

A plurality of alternative forward lock positions may be achieved by again operating the cam plate 24 to disengage the arcuate surface 88 of the locking member 22. Once disengaged, the locking member 22 is movable across the pawl teeth portion 16 until a desired position has been achieved. Upon achieving a desired position, the cam plate 24 is released, again biasing the locking member 22 into engagement with a particular tooth 26 of the pawl teeth portion 16.

To return the quadrant 14 to an upright position, relative to the arm 12, the cam plate 24 is again rotated against the biasing force of spring 76 to disengage the cam plate 24 from the locking member 22. As the quadrant 14 rotates rearwardly, the locking member 22 moves from a recessed position adjacent to the second side surface 36 to a raised position on the top surface 38 of the shoulder 30. Specifically, the locking member 22 is pinched between the second side surface 36 of the arm 12 and the slots 100,102 until the locking member 22 slides onto the top surface 38 of the arm 12. Once the locking member 22 is on the top surface 38, the cam plate 24 may be released wherein the spring 76 again biases the cam plate 24 in the first rotational direction. Thus, the cam surface 72 biases the locking member 22 within the slots 100,102 to force the locking member 22 against the top surface 38. After the quadrant 14 is rotated sufficiently rearward, the bias of the cam plate 24 causes the locking member 22 to slide within slots 100,102, toward the corner 38 and against first side surface 32, thereby locking the quadrant 14 in an upright position.

Figure 5:
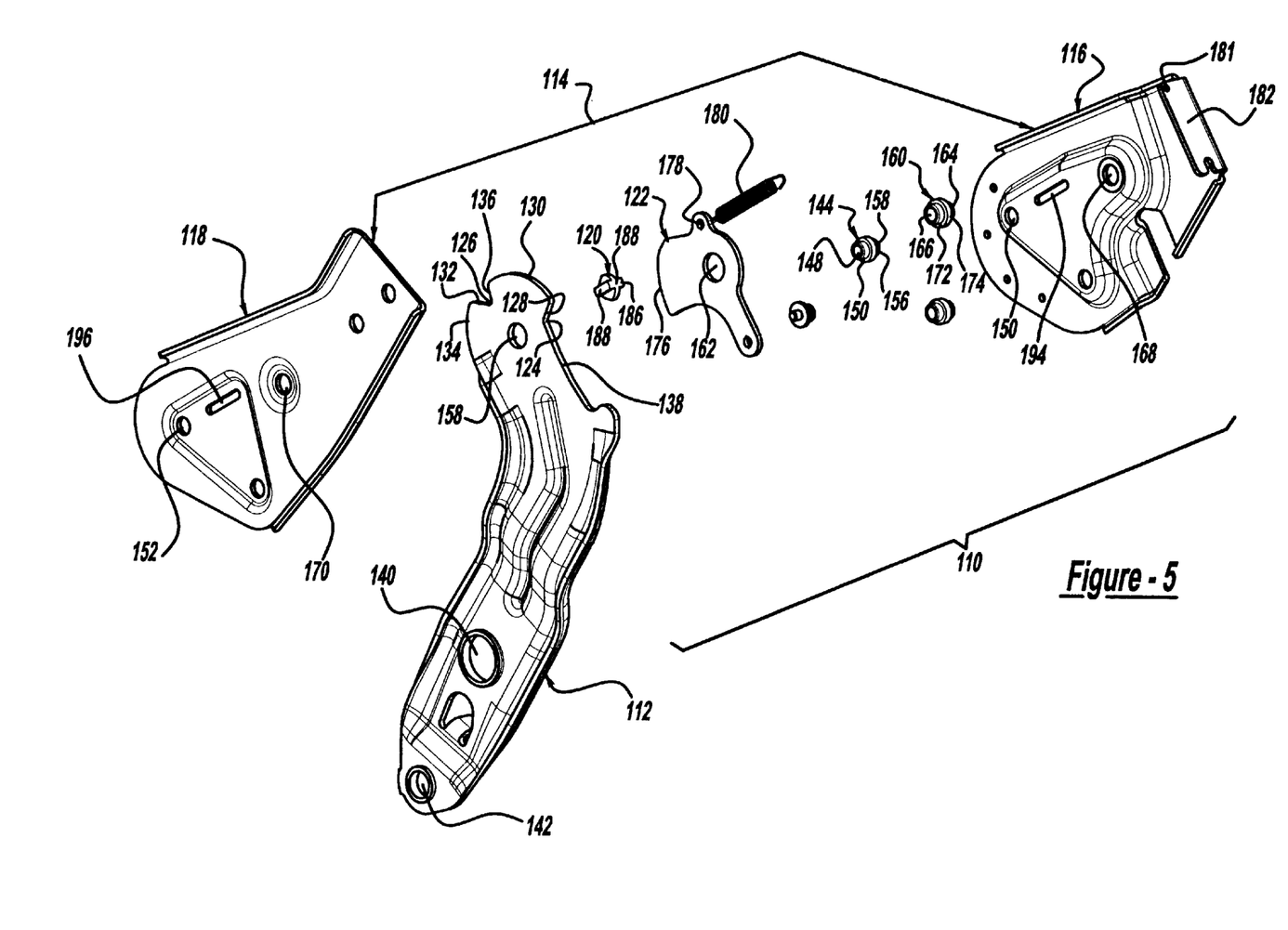
FIG. 5 is a exploded perspective view of a second embodiment of the adjustment mechanism of the present invention.

With reference to FIG. 5, a second preferred embodiment of the present invention is indicated as adjustment mechanism 110. The adjustment mechanism 110 generally includes an arm 112 disposed between and pivotally mounted to a quadrant 114 including inner and outer plates 116,118. The quadrant 114 is selectively locked relative to the arm 112 by a locking member 120 that is selectively engaged by a cam plate 122.

A first end of the arm 112 includes a first corner 124, a second corner 126, a first side surface 128, a first top surface 130, a second top surface 132, an arcuate surface 134, a second side surface 136, and a third top surface 138. The first corner 124 is formed at the intersection of the first side surface 128 and the third top surface 138. The second corner 126 is formed at the intersection of the second top surface 132 and the second side surface 136. A second end of the arm 112 includes a first aperture 140 for providing a pivot axis and a second aperture 142 for connecting to a linear recliner mechanism (see FIGS. 6a through 7). The arm 112 rotatably supports the inner and outer plates 116,118 on a first pivot 144.

The first pivot 144 includes first and second cylindrical extensions 146,148 that are received into and supported by apertures 150,152 in the inner and outer housing plates 116,118. The first pivot 144 also includes a radially extending support bearing 154 that includes a bearing surface 156. The first pivot 144 is received through an aperture 158 of the arm 112, whereby the first pivot 144 rotatably supports the quadrant 114 relative to the arm 112.

The cam plate 122 is also disposed between the inner and outer housing plates 116,118 and is rotatably supported therebetween by a second pivot 160 received through a central aperture 162 of the cam plate 122. The second pivot 160 includes first and second cylindrical extensions 164,166 that are received into and supported by apertures 168,170 in the inner and outer plates 116,118, respectively. The second pivot 160 also includes a radially extending support bearing 172 that includes a bearing surface 174. The second pivot 160 is received through the aperture 162 of the arm 112, whereby the second pivot 160 rotatably supports the quadrant 114 about the bearing surface 174.

One end of the cam plate 122 includes a cam surface 176 and an opposite end of the cam plate 122 includes an aperture 178 for anchoring a first end of a spring 180. The spring 180 is connected between the cam plate 122 and an aperture 181 formed through a tab 182. Tab 182 is formed along a top surface of the inner plate 116. The spring 180 rotationally biases the cam plate 122 in a first direction causing the cam surface 176 to bias the locking member 120 toward the first corner 124 and against first side surface 128 of the arm 112. When the locking member is in this position, the inner and outer plates 116,118 are held in a first upright position relative to the arm 112.

The locking member 120 interfaces between the arm 112 and the cam plate 122 and includes an arcuate surface 188 for engaging the cam surface 176 of the cam plate 122. The cam plate 122 acts on the arcuate surface 188 to bias the locking member 120 against the arm 112. Ribs 186,188 extend perpendicularly from respective side faces of the locking member 120. The ribs 186,188 are slidably supported within slots 194,196 of the inner and outer plates 116,118, enabling the locking member 120 to slide therebetween.

As previously described, the quadrant 114 can be folded forward relative to the arm 112 and locked in a single forwardly inclined position. To fold the quadrant 114 forward, the cam plate 122 is rotated in a second direction against the bias direction of the spring 180. As the cam plate 122 rotates in the second direction, the cam surface 176 slides along and then moves away from the arcuate surface 184 of the locking member 120, thus freeing the locking member 120 to slide in the slots 194,196 of the inner and outer plates 116,118 as it moves from a recessed position adjacent to the first side surface 128 to an outward position on the first top surface 130 of the arm 112. Specifically, as the cam plate 122 rotates against the bias of the spring 180, the locking member 120 is pinched between the first side surface 128 of the arm 112 and slots 194,196. As the cam surface 176 is moved from blocking the locking member 120, upward movement of the locking member 120 is unrestricted. The walls defining the slots 194,196 of the inner and outer plates 116,118 push the locking member 120 upwards within slots 194,196 until the locking member 120 slides over onto the first top surface 130 of the arm 112. Once the locking member 120 is on the first top surface 130, the cam plate 122 can be released so the spring 180 again biases the cam plate 122 in the first rotational direction, further biasing the locking member 120 against the first top surface 130.

After sufficient forward rotation of the quadrant 114, the locking member 120 slides off of the first top surface 130 and into the second corner 126. The locking member 120 is biased into engagement with the second corner 126 by the cam plate 122. The engagement of the locking member 120 and the second corner 126 holds the quadrant 114 in a forward position relative to the arm 112.

The quadrant 114 may be rotated further forward by again rotating the cam plate 122 against the bias of the spring 180, relieving engagement of the cam plate 122 and the locking member 120. The quadrant 114 rotates forward, pinching the locking member 120 between the slots 194,196 and the second top surface 132. Again, the walls defining the slots 194,196 push the locking member 120 upward within the slots 194,196 until locking member 120 slides over onto the arcuate surface 134. Once the locking member 120 is in contact with the arcuate surface 134, the cam plate 122 can again be released wherein the spring 180 biases the cam plate 122. As a result, the cam surface 176 again pushes the locking member 120 downward in the slots 194,196, biasing the locking member 120 against the arcuate surface 134. By rotating the quadrant 114 sufficiently backward, the locking member 120 can be again positioned within the second corner 126, locking the quadrant 114 in the first forward position.

The quadrant 114 may be rotated backward to the initial upright position by again operating the cam plate 122 against the bias of the spring 180, thus disengaging the cam plate 122 from the locking member 120. As the quadrant 114 rotates backward, the locking member 120 is pinched between the slots 194,196 and the second side surface 136, pushing the locking member 120 upward in the slots 194, 196 and over onto the first top surface 130. Upon sufficient backward rotation of the quadrant 114, the locking member 120 is pushed downward into engagement with the first corner 124 by the cam plate 122. thus, the quadrant 114 is locked in the first upright position.

Figure 7:
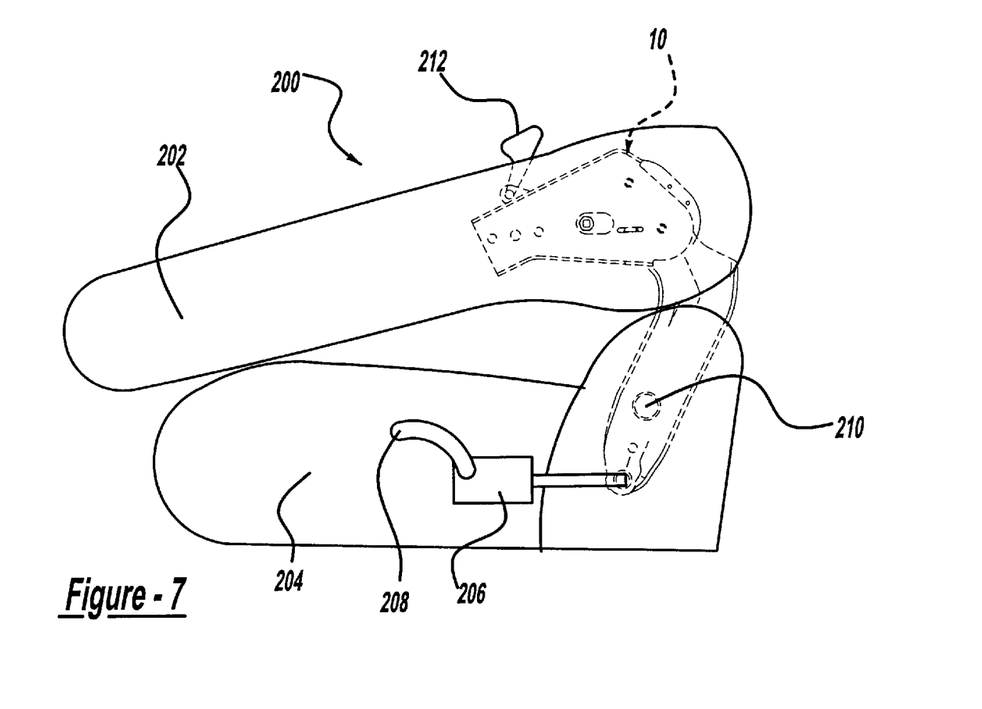
FIG. 7 is a side view of a seat assembly with a seat back in a forward-folded position relative a seat according to the present invention.

With reference to FIGS. 6a, 6b, 6c and 7, implementation of adjustment mechanism 10 in a seat assembly 200 is shown. The seat assembly 200 includes a seat back 202, a seat 204, the adjustment mechanism 10 and a linear recliner mechanism 206. The linear recliner mechanism 206 includes a handle 208 and is of a type commonly known in the art. The linear recliner mechanism 206 is operable to pivot the seat back 202 relative to seat 204 and to lock the seat back 202 in a plurality of reclined positions. The seat back 202 is shown in an upright position, a first reclined position and a second reclined position, in FIGS. 6a, 6b and 6c, respectively. As the seat back 202 reclines rearwardly, the adjustment mechanism 10 rotates about a pivot axis 210. The quadrant 14 of the adjustment mechanism 10 mount the seat back 202 to the seat 204 through the arm 12. The adjustment mechanism 10 is operable in any reclined position of seat back 202, by a handle 212, to fold the seat back 202 forward relative to the seat 204. FIG. 7 illustrates a fold-forward position of seat back 202 from the first reclined position shown in FIG. 6b. It should be noted, however, that while the adjustment mechanism 10 was used in the above description, the adjustment mechanism 110 may substitute in accordance with the invention.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An adjustment mechanism, comprising:
   a quadrant;
   an arm rotatably supporting said quadrant;
   a locking member slidably supported by said quadrant for engaging said arm, whereby said quadrant is selectively locked in an upright position and one of a plurality of fold-forward positions relative to said arm; and
   a cam plate rotatably supported by said quadrant for positioning said locking member relative to said arm.

2. The adjustment mechanism of claim 1, further comprising a biasing member for biasing said cam plate toward said arm, whereby said locking member is biased against said arm to lock said quadrant in said one of a plurality of fold-forward positions relative to said arm.

3. The adjustment mechanism of claim 2, wherein said biasing member is a spring.

4. The adjustment mechanism of claim 1, wherein said cam plate includes a cam surface that interfaces with said locking member to slidably bias said locking member.

5. The adjustment mechanism of claim 1, wherein said arm includes a plurality of pawl teeth for selective engagement with said locking member to selectively lock said quadrant in said one of a plurality of fold-forward positions relative to said arm.

6. The adjustment mechanism of claim 5, wherein said arm includes a corner portion for blocking said locking member, whereby said quadrant is positioned substantially parallel to said arm.

7. The adjustment mechanism of claim 1, wherein said quadrant includes inner and outer housing plates rotatably supporting said cam plate and slidably supporting said locking member.

8. The adjustment mechanism of claim 1, wherein said locking member is a wedge-shaped body including an arcuate surface at a wide end for engaging said cam plate and a notch at a narrow end for engaging said arm.

9. An adjustable seat assembly, comprising:
   a seat;
   a seat back pivotably interconnected to said seat through a recliner mechanism; and
   a fold-forward mechanism coupled to said seat back for adjustably positioning said seat back in one of a plurality of fold-forward positions relative to said seat, said fold-forward mechanism including:
     a quadrant supporting said seat back;
     an arm interconnected to said seat and rotatably supporting said quadrant;
     a cam plate rotatably supported by said quadrant; and
     a locking member slidably supported by said quadrant for locking said seat back in said one of a plurality of fold-forward positions relative to said seat.

10. The adjustable seat assembly of claim 9, further comprising a biasing member for biasing said cam plate toward said arm to force said locking member against said arm, whereby said seat back is locked in said one of a plurality of fold-forward positions relative to said seat.

11. The adjustable seat of claim 10, wherein said biasing member is a spring.

12. The adjustable seat of claim 9, wherein said cam plate includes a cam surface that interfaces with said locking member to slidably bias said locking member toward said arm.

13. The adjustable seat of claim 9, wherein said arm includes a plurality of pawl teeth for selective engagement with said locking member to selectively lock said seat back in a plurality of fold-forward positions relative to said seat.

14. The adjustable seat of claim 13, wherein said arm further includes a corner portion for blocking said locking member to lock said seat back in a position substantially perpendicular to said seat.

15. An adjustable seat assembly, comprising:
   a seat;
   a seat back pivotably interconnected to said seat about a first pivot through a recliner mechanism; and
   a fold-forward mechanism integrated into said seat back and providing a second pivot spaced above said first pivot for adjustably pivoting said seat back about said second pivot in one of a plurality of settable fold-forward positions relative to said seat.

16. The adjustable seat assembly of claim 15, wherein said fold-forward mechanism includes:
   a quadrant supporting said seat back;
   an arm interconnected to said seat and rotatably supporting said quadrant about said second pivot;
   a cam plate rotatably supported by said quadrant; and
   a locking member slidably supported by said quadrant for locking said seat back in said one of a plurality of fold-forward positions relative to said seat.

17. The adjustable seat assembly of claim 16, further comprising a biasing member for biasing said cam plate toward said arm to force said locking member against said arm, whereby said seat back is locked in said one of a plurality of fold-forward positions relative to said seat.

18. The adjustable seat of claim 16, wherein said cam plate includes a cam surface that interfaces with said locking member to slidably bias said locking member toward said arm.

19. The adjustable seat of claim 16, wherein said arm includes a plurality of pawl teeth for selective engagement with said locking member to selectively lock said seat back in a plurality of fold-forward positions relative to said seat.

20. The adjustable seat of claim 19, wherein said arm further includes a corner portion for blocking said locking member to lock said seat back in a position substantially perpendicular to said seat.

* * * * *